United States Patent [19]

Gawrys et al.

[11] Patent Number: 5,001,710
[45] Date of Patent: Mar. 19, 1991

[54] CUSTOMER PROGRAMMABLE AUTOMATED INTEGRATED VOICE/DATA TECHNIQUE FOR COMMUNICATION SYSTEMS

[75] Inventors: George W. Gawrys, Bridgewater; Dale G. Leasure, Toms River; Richard J. Nici, Tinton Falls, all of N.J.; Richard A. Oberman, Park Ridge, Ill.; Henri Setton, Highland Park; William T. Willcock, Rumson, both of N.J.; David L. Woody, Wheaton, Ill.

[73] Assignee: AT&T Bell Laboratories, Murray Hill, N.J.

[21] Appl. No.: 426,385

[22] Filed: Oct. 24, 1989

[51] Int. Cl.$^5$ .............................................. H04J 3/12
[52] U.S. Cl. ................................................... 370/110.1
[58] Field of Search .................. 370/58.1, 60, 110.1, 370/58.2; 340/721; 379/93, 94, 96, 265

[56] References Cited

U.S. PATENT DOCUMENTS

| | | | |
|---|---|---|---|
| 4,600,814 | 7/1986 | Cunniff et al. | 379/94 |
| 4,656,623 | 4/1987 | Dalby Jr. et al. | 370/60 |
| 4,656,624 | 4/1987 | Collins et al. | 370/60 |
| 4,788,682 | 11/1988 | Vij et al. | 370/110.1 |
| 4,805,209 | 2/1989 | Baker Jr. et al. | 379/96 |
| 4,942,602 | 7/1990 | Baker, Jr. et al. | 370/62 |
| 4,943,995 | 7/1990 | Daudelin et al. | 379/96 |
| 4,943,996 | 7/1990 | Baker, Jr. et al. | 378/96 |

OTHER PUBLICATIONS

No Author, *Comm. News*, vol. 23, No. 7, Jul. 1986, pp. 31-33.
Falconer et al., *Proc. IEEE*, vol. 74, No. 9 Sep. 1988, pp. 1246-1261.
Keeney, *Telephony*, vol. 214, No. 12, Mar. 21, 1988, pp. 28-30.
Page, *The Office*, vol. 107, No. 5, May 1988, pp. 69-70.
Borton, *Proceeding ISDN '88*, London, England, Jun. 1988, pp. 155-162.
Canavan et al., *IEEE Global Telecomm. Conf. & Exhibition*, Hollywood, Florida, Nov./Dec. 1988, vol. 2, pp. 883-887.

Primary Examiner—Douglas W. Olms
Assistant Examiner—Melvin Marcelo
Attorney, Agent, or Firm—Erwin W. Pfeifle; Barry H. Freedman

[57] ABSTRACT

The present invention enables multi-windowing agent computer terminals, that answer a variety of, e.g., telemarketing calls, to (i) receive call-related information from a communication system at an agent terminal for automatic display in a "telephony" window, and (ii) automatically send such information to a host computer system application software and retrieve caller desired information based on the calling or called number for display in a "host application" window without requiring a caller to provide verbal information. The present invention also enables an agent terminal to automatically transfer caller-related information from one window to another window via programmable function key commands which can be programmed by a user/system administrator regarding what information is to be copied and where and when to copy it. This allows the user/system administrator to program the system to (1) retrieve information using the received call-related data without routing caller data to the host computer application software prior to its delivery to the agent terminal, and (2) automatically transmit collected data to the host database at a call's conclusion.

8 Claims, 4 Drawing Sheets

FIG.4

TELEPHONY WINDOW 53

```
->_3 Goodyear Tire ACD 555-1212
 _Active____a (PF1)
 _Idle_____b (PF2)
  Conference (PF3)
  Transfer   (PF4)
  Hold   (PF5)
  Drop   (PF6)

Event Key1 (PF7)
 Event Key2 (PF8)
 Event Key3 (PF9)
 Event Key4 (PF10)
```

APPLICATION WINDOW 56

Main Menu Select Number
followed by ENTER

1. General Motors
2. Reynolds
3. Goodyear Tires
4. Fenway Park

Termial Status Line

FIG.6

APPLICATION WINDOW 57

Goodyear Main Menu

Caller Number _____
Caller Address _____
Depress PF2 for Tire Info
Depress PF3 for Locations Termial Status Line

CUSTOMER PROGRAMMABLE AUTOMATED INTEGRATED VOICE/DATA TECHNIQUE FOR COMMUNICATION SYSTEMS

TECHNICAL FIELD

The present invention relates to a customer programmable automated integrated voice/data technique for communication systems and, more particularly, to an information management services technique which enables an agent answering a call to obtain caller related information, send it to a host database computer system application software, and retrieve caller records without requiring a caller to provide verbal information.

DESCRIPTION OF THE PRIOR ART

The use of information management services has been increasing in recent years and has been projected as reaching a 25 billion dollar market by 1990. Many of these services are called "telemarketing", a broad term that can be used to label anything from sales, to customer accounting services, to order processing, to conducting surveys, and to many other services that all use telecommunications. One prior art technique used for such information management services requires that an agent verbally query a caller for pertinent information, then manually type such information into a host database computer system, whereby pertinent caller records are stored and retrieved from.

A second technique retrieves caller records automatically from a host database computer system, but requires that the caller data first be routed to the host database computer system application software prior to the delivery of such caller data to the agent terminal. In this regard see, for example, the article entitled "AT&T Customer Trial of the ISDN Primary Rate Interface" by G. Canavan et al. in the Conference Record of the IEEE Global Telecommunications Conference and Exhibition, Hollywood, Fla., Nov./Dec. 1988, Volume 2, at pages 883–887. There, individual agents of a "Shared Group" of agents handle incoming calls for several campaigns simultaneously, where calls for each campaign are associated with separate telephone numbers. With Integrated Services Digital Network (ISDN), the called number, calling party number, and agent identity all get sent from the network switch to the host database computer application software so that the host database computer system can bring up the appropriate campaign and script automatically at the correct agent's display terminal.

The problem remaining in the prior art is to further streamline the initial interaction of an incoming information management services call by avoiding, for example, call-related data from first proceeding to the host database computer system application software before any data is displayed at and agent's display terminal.

SUMMARY OF THE INVENTION

The foregoing problem in the prior art has been solved in accordance with the present invention which relates to customer programmable automated integrated voice/data systems which include (1) an agent terminal with a multi-window display, and (2) processing equipment that directs caller related incoming voice and data information from a communications network to the agent terminal and routing commands from the agent terminal to appropriate host database computer systems. Once an agent terminal receives call-related data information, the terminal is programmed for automatically displaying the call related data in a "Telephony" window, while the agent terminal uses such call-related data to automatically (1) display function key options and/or (2) retrieve service or campaign information fields from an appropriate host database computer system for each separate service or campaign an agent may deal with for display in separate Host "Application" windows of the terminal. With such format, a host database computer system is unaware of what is being done and only responds to commands that appear as a keyboard entry at an agent terminal. It is also an aspect of the present invention that information displayed in one window of the agent terminal may be transferred to another window or to the host database using Customer Programmable Function Keys, or programmed commands that simulate such function key responses at the agent terminal, where the function keys can be programmed to direct what information is to be copied as well as where and when to copy it.

Other and further aspects of the present invention will become apparent during the course of the following description and by reference to the accompanying drawings.

BRIEF DESCRIPTION OF THE DRAWINGS

FIGS. 4–6 show exemplary "telephony" and first and second "host" application windows, respectively, as might be produced by the main card of FIG. 3.

DETAILED DESCRIPTION

Figure 1:
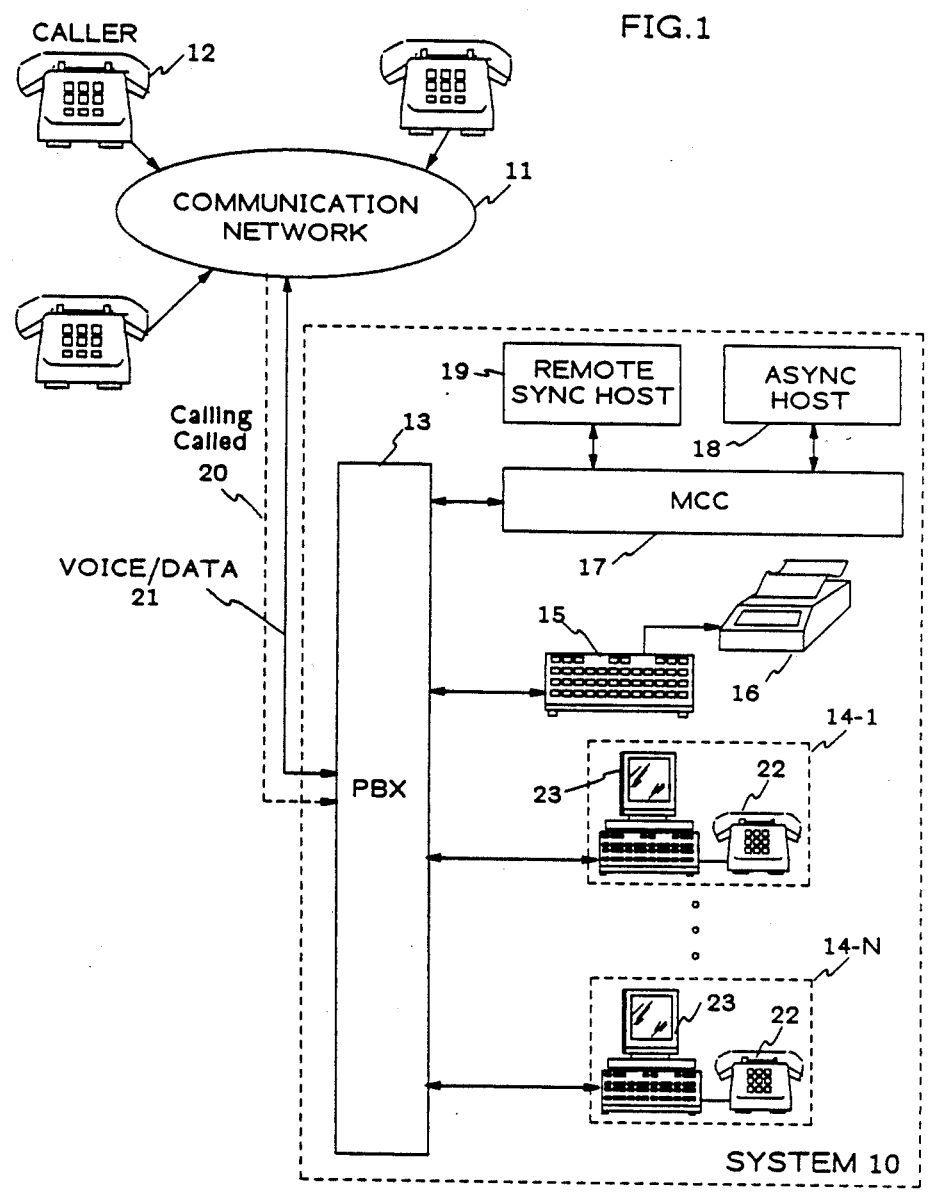
FIG. 1 is a block diagram of the overall customer programmable integrated voice/data system in accordance with the present invention.

The present invention relates a customer programmable integrated voice/data capability which is described hereinafter relative to a telecommunications information management services market, such as telemarketing, but it should be understood that the present invention could be used for other telecommunications markets where calling information is displayed at a terminal. FIG. 1 illustrates a preferred embodiment of an exemplary telemarketing system 10 arrangement for practicing the present invention, but it is to be understood that such exemplary system arrangement could be modified to comprise other suitable equipments which function to provide the functions described hereinafter, and still fall within the spirit and scope of the present invention.

In FIG. 1, the present exemplary telemarketing system 10 is connected for bidirectional communication with a national communications network 11, such as the AT&T network in the United States, to provide communications with many telephones, such as telephone 12, being serviced within the large geographical service area of communications network 11. It is to be understood that communications network 11 is arranged for transmitting caller related information, such as the calling number and called number and any other caller supplied information such as social security or account number, over a signaling channel 20 to system 10 while transmitting bidirectional voice/data information over channels 21 as may be found with an Integrated Services Digital Network (ISDN). System 10 is shown as comprising a Private Branch Exchange (PBX) 13 with Automatic Call Distribution (ACD), that functions to provide the interface and call distribution capability for voice and data between communications network 11 and the components of system 10.

PBX 13 is shown connected to (a) a plurality of N agent terminals $14_1$ to $14_N$, such as the AT&T 6500 series terminals with multi-windowing capability and a telephone 22, for answering incoming, or initiating outgoing, telemarketing voice/data calls, (b) a printer controller 15 (e.g., AT&T Model 6561 printer controller) and printer 16 for providing print-outs of data for purposes of system administration, etc., and (c) a Multi-Function Communications Controller (MCC) 17 as, for example, an AT&T model 6544 MCC. Communications between these components can comprise any suitable protocol as, for example, the Digital Communications Protocol (DCP) for use between a System 75 or 85 PBX and the agent terminals 14 and printer controller 15, which protocol uses two information channels I1 and I2 operating at 64 kb/s and an S-channel for signaling information running at 8 kb/s; and the ISDN Primary Rate Interface protocol providing 23 B (bearer) 64 kb/s channels and a single 64 kb/s D (message oriented signaling) channel between PBX 13 and MCC 17.

MCC 17 functions as an interface between PBX 13 and one or more host application database computer systems 18 and 19, where for purposes of illustration a first asynchronous host application database computer system 18, and a second synchronous host application database computer system 19. Such second host application database computer system 19 can be located remote from MCC 17, as in another building, thereby requiring communications between it and MCC 17 that are synchronized. For purposes of discussion hereinafter, it will be assumed that a separate host application database computer system is used for storing data related to each different campaign or service an agent might handle.

In operation, for an incoming customer service application such as catalog sales, airline reservations, company health or stock plan information, providing a nearest dealer location, etc., the exemplary caller 12 dials, for example, a designated Service number, e.g., an 800 number, reserved by communications network 11 for a specific service provider dealing with the specific service that the caller desires. The call, along with caller related information such as the telephone number of the caller telephone (calling party number), as may be provided by Automatic Number Identification (ANI) in communications network 11, and the identity of the dialed telephone number (called party number), as may be provided by Dialed Number Identification Service (DNIS) for 800 service calls in communications network 11, traverses network 11 and arrives at an Automatic Call Distributor (ACD) forming a part of PBX 13. For purposes of illustration, it will be assumed that agent terminal $14_1$ is logged onto system 10 but is presently idle and not handling a call. The ACD functions to choose an appropriate idle agent terminal, which in this case is assumed to be agent terminal $14_1$, and alerts that agent terminal for the incoming voice call to the agent terminal telephone 22.

Logic circuitry in agent terminal $14_1$ receives the ANI and DNIS information and displays such information in a "Telephony" window of agent terminal $14_1$, and uses this information via a predetermined channel through PBX 13 and MCC 17 to automatically query the appropriate host application database computer system, e.g., host computer system 18, for a customer or other appropriate records relative to the campaign or service to be provided. For example, the called party number can be used by agent terminal $14_i$ to automatically access the host application database computer system associated with the service denoted by that called number. Alternatively, the calling party number can be used to obtain the appropriate file record for that service, e.g., the area code can be used to provide a list dealers within that area code or the whole calling number can be used to extract that customer's records from the host database computer system.

More particularly, as the agent answers the call at agent terminal $14_1$, the appropriate call-related information (ANI, DNIS, etc.) originally received by the agent terminal $14_1$ is automatically displayed in a first "Telephony" window on terminal screen 23 in accordance with the present invention. Agent terminal $14_1$ also automatically provides service related functions and or/records that can be requested by the agent, e.g., based on the received calling number, for display in one or more concurrent "applications" windows associated with a queried host application database computer, e.g., host 18. In the "Telephony" window, the programming informs the agent that (1) either the host computer system has been queried or (2) a host "Application" window provides the response information from the host database computer system if already accessed-ready for use by the agent. The agent then responds to the service requested by the calling party using the displayed information automatically obtained or by using programmable function keys at the agent terminal to retrieve other needed information from the host database computer system, and concludes the call to await the next call.

Figure 2:
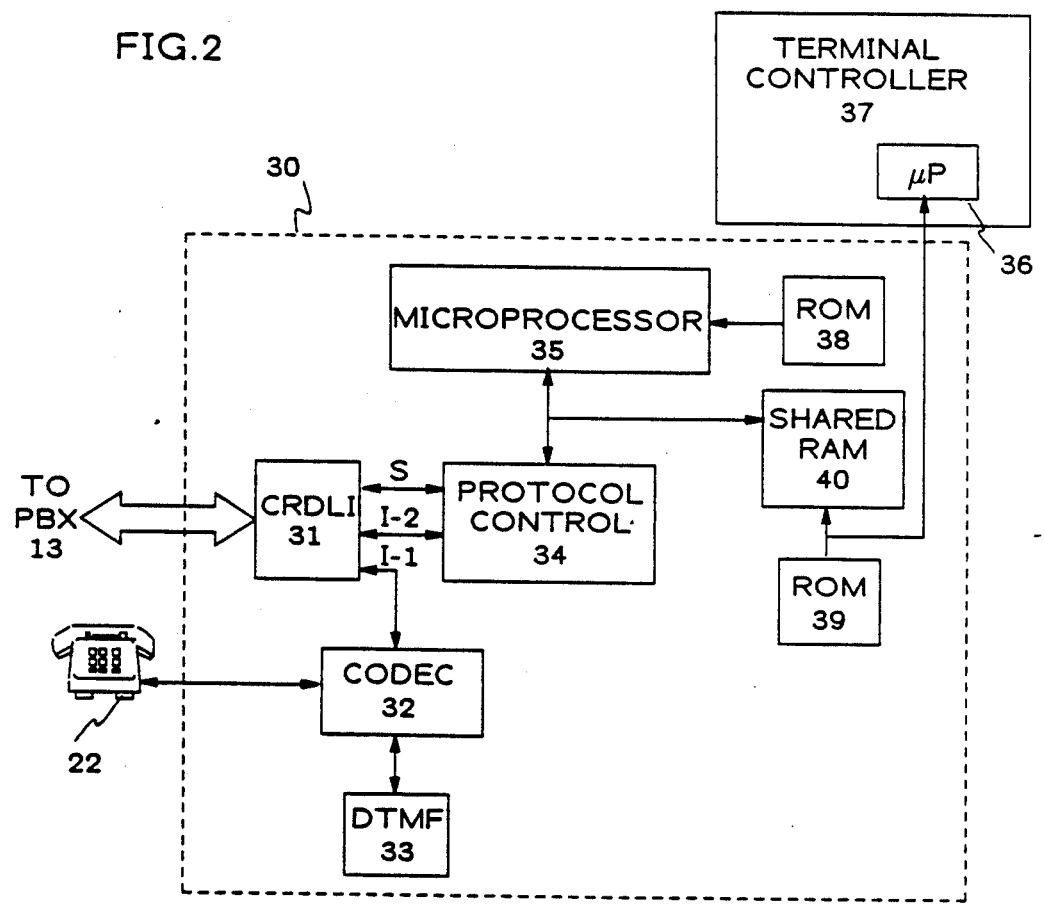
FIG. 2 is a block diagram of an interface card of an agent terminal in accordance with the present invention.

Relative to the above example, FIG. 2 illustrates a block diagram of an exemplary interface card 30 located in each agent terminal $14_i$, that functions to process and direct the voice, data and signaling information between PBX 13 and other portions of agent terminal $14_i$ during the handling of a call. For purposes of discussion hereinafter, and not for purposes of limitation, it will be assumed that the protocol used between PBX 13 and agent terminal $14_i$ will be the Digital Communications Protocol (DCP), as defined hereinbefore, which is used, for example, with an AT&T system 85 PBX. It is to be understood that interface card 30 effectively functions as a gateway for signals propagating between PBX 13 and agent terminal $14_i$, and is shown as comprising an interface transformer 31, such as an AT&T Code 257 AT device which is also known as a Cost Reduced Data Link interface (CRDLI), that interfaces with PBX 13 and the rest of interface card 30 and agent terminal $14_i$ to bidirectionally receive and direct the voice, data and signaling information relating to a call in the proper direction and with the appropriate protocols. The voice portion of the signals (I1 in the DCP protocol) propagating between PBX 13 and agent terminal $14_i$ is directed between interface transformer 31 and a codec 32 which includes a device 33 that functions with the dial signals to be used as, for example, a Dial Tone Multi-Frequency (DTMF) device for agent initiated outgoing calls. The voice signals themselves propagate between codec 32 and agent terminal telephone 22 to permit the agent to converse with a caller.

A Protocol Controller 34 functions to interact with interface transformer 31 and each of a first microprocessor 35, disposed on interface card 30, and a second microprocessor 36, disposed at the agent terminal controller 37, to provide the appropriate protocol for each of the signaling (S1 and S2 associated with the voice I1 and data I2 channels of the DCP protocol), and data (I2 of the DCP protocol) information, such as the ANI, DNIS information and the commands to be transmitted to or received from other portions of agent terminal $14_i$. The first and second microprocessors 35 and 36 have associated therewith a first and second Read Only Memory (ROM) 38 and 39, respectively to provide the necessary firmware for each microprocessor. A shared Random Access Memory (RAM) 40 provides for the queuing and transfer of data control and status signals between microprocessors 35 and 36 and protocol controller 34. Therefore, any signaling (S) or data (I2) signals that are received from PBX 13 are sent through interface transformer 31 and protocol controller 34 and temporarily stored in shared RAM 40. Microprocessors 35 and 36 then access the stored S and I2 channel information and function as directed by the firmware in associated ROMs 38 and 39, respectively, as will be explained in greater detail hereinafter.

Figure 3:
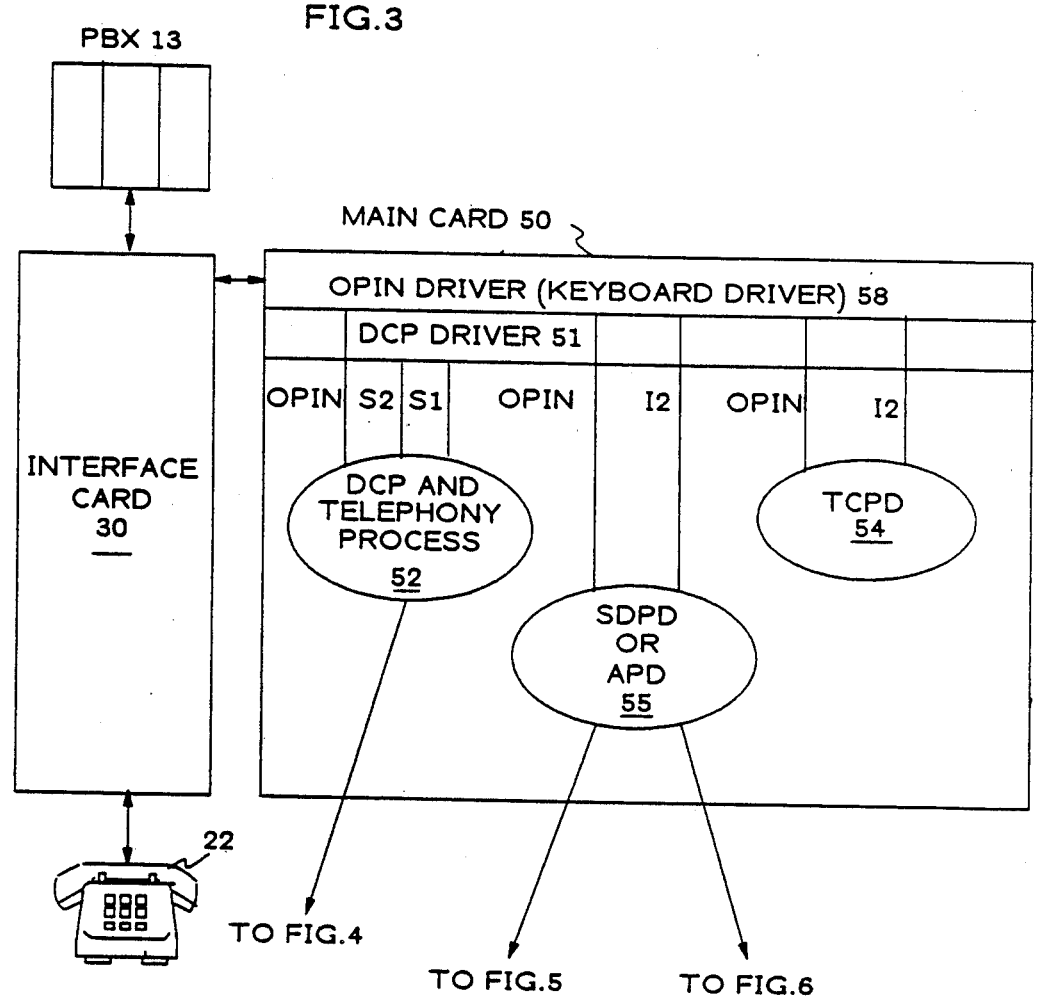
FIG. 3 is a block diagram of a main card of an agent terminal in accordance with the present invention.

FIG. 3 is a diagram to aid in explaining the present invention in conjunction with the prior discussion of FIGS. 1 and 2. FIG. 3 illustrates the interconnection of PBX 13 with Interface card 30, and, in turn, agent terminal telephone 22 and a Main Card 50 in the agent terminal $14_i$ to provide (1) the necessary processing of the received I2 and S signals of the exemplary DCP protocol, and (2) produce the necessary signaling commands and window displays at the agent terminal for processing a call. For purposes of explanation, it will be assumed that telemarketing system 10 is used to provide service relative to, for example, dealer locations and/or product or other information for four separate campaigns related to (1) General Motors via assigned telephone number 800-555-1111, (2) Reynolds Aluminum via telephone number 800-555-1112, (3) Goodyear Tires via telephone number 800-555-1212, and (4) Fenway Park via telephone number 800-555-1211, and that a caller 12 wishes information about Goodyear Tire dealer locations.

When a caller 12 inputs the calling telephone number 800-555-1212, communications network 11, e.g., an Integrated Services Digital Network, accumulates the calling and called numbers and directs the call with the call-related information to system 10. When the call, and the associated call-related information, is received by PBX 13, the automatic call distribution of PBX 13 finds an idle logged-on agent terminal $14_i$ and transmits the (1) voice, (2) data and (3) associated signaling information via the exemplary DCP I1, I2, and S channels to interface card 30. Protocol controller 34 receives and decodes the I2 and S channel messages, and the firmware in ROM 38 of interface card 30 queues the incoming call message(s) in shared RAM 40 and interrupts second microprocessor 36 in terminal controller 37, while the agent telephone 22 is alerted via codec 32 to the reception of a call. A DCP Driver 51 (FIG. 3), in the operating system of main card 50 for second microprocessor 36, services the interrupt and routes the message to an exemplary DCP process 52 which also controls a novel "Telephony" window 53 on the screen of agent terminal $14_i$. Telephony window 53 functions to initially show (1) any pertinent call-related related information, and (2) the functional use of each of the Programmable Function keys, e.g., function keys 1 to 10 of the agent terminal keyboard.

The DCP process 52 parses the message(s) and updates the Telephony window accordingly by adding, for example, the called number and if needed the calling number (not shown) and any other signaling data provided by the caller over the S signaling channel as, for example, a social security or account number which may be necessary for servicing a caller, e.g., in a bank, etc. The DCP process also can display any telephony state changes, e.g., call-on-hold, etc. as shown in FIG. 4. The DCP process 52 then communicates with a Terminal Control Process For A Device (TCPD) 54 through a keyboard driver 58, which emulates an agent depressing a corresponding pre-recorded playback key on the agent's keyboard. TCPD 54 functions as terminal controller 37 for controlling the special terminal features, such as Command Mode processing, and Workstation Control Mode processing in conjunction with Keyboard Driver (Opin) 58 which also serves to route messages between TCPD 54 and (1) Synchronous Data Process Device (SDPD) or Asynchronous Process Device (APD) 55 or (2) DCP process 52. SDPD or APD 55 work with the host database application computer systems 19 and 18, respectively, to provide normal agent terminal functions as found in other systems. Therefore, TCPD 54 provides control for moving information around both agent terminal $14_i$ and system 10 by looking at, for example, ANI and/or DNIS information received from a caller to see what is occurring at that instant of time, and sending needed information (1) between windows automatically or (2) via programmed simulated keyboard key strokes automatically back through PBX 13 and MCC 17 to retrieve information from host application database computer systems 18 and/or 19.

As a result, when TCPD 54 receives the message from DCP process 52, through the Keyboard Driver 58 it invokes the playback of the corresponding pre-recorded keystrokes, stored in the agent terminal. Such pre-recorded keystrokes may be programmed to automatically make a main menu selection based on the received called number (DNIS) 555-1212 relating to the Goodyear Tire campaign, e.g. item 3 from the Main Menu selection shown in application window 56 showing all campaigns serviced by the system. Prerecorded keystrokes may also be programmed to display application window 57 relating to the Goodyear Main menu which includes any caller related information and function key assignments for automatically obtaining available information from the host application database computer system 18 or 19 relating to what a caller is requesting of an agent.

In the present example, caller 12 wishes information about a nearest Goodyear Tire dealer, and TCPD 54 would invoke the automatic transfer of the caller number (including the area code and telephone number) and the caller address (if needed) from DCP 52 into the application window 57. Then by the agent depressing programmable function key PF3, as indicated in application window 57, SDPD or APD would send the necessary digits of the caller number through PBX and MCC 17 to the correct host application database computer system 18 or 19, storing the desired information about Goodyear Tire dealers, in order to retrieve the names and addresses of dealers within the area code and central office code of the caller's area. Additionally, with the knowledge of the town of a caller from the caller address, one or two dealers might be made to appear in a window (not shown) at the agent's screen, and such information could be communicated via telephone 22 to caller 12. It is to be understood that such windows 53, 56, 57 and the Goodyear dealer names and address window would all appear as separate windows on the screen of the agent's terminal 14$_i$ in overlapping sequence, and the agent could move between such windows. As shown in Telephony window 53, during a call an agent may be required to place a caller on a conference or on hold, which functions can be accomplished by depressing pre-programmed keys PF3 and PF5, respectively. At the end of a call, the agent need only depress preprogrammed "release" key to disconnect the agent from the call to await a next call.

The agent terminal call-handling voice/data interface card 30 requires terminal software that recognizes and parses the DCP S-channel message(s) containing call-related information, e.g. ANI and DNIS. The extracted information is stored in a pre-defined location in a specific window, e.g. Telephony window 53, which is not associated with an host Application window. Once stored in the Telephony window 53, the information can be processed and sent to any of the other windows attached to host-based applications using existing features of the agent terminal, such as a window-to-window copy command. The copy command together with the ability to record keystrokes into function keys (which can be saved on the MCC 17 floppy diskette, represents the beginnings of a programmable mechanism for adaptation to customer specific installations. Using this approach, an agent can modify, e.g., place quotes around ANI, and send call-related information by executing any of the agent terminal function keys.

This approach enables the agent or system administrator to automate much of the interaction between the network and the telemarketing application. Play-back of function keys also enables agents to pace themselves and ensure that specific network information is aligned with the appropriate screen or window within the telemarketing application. For example, when application window 57 asks for the caller's phone number, a function key containing commands to copy the ANI information from the telephony window to the telemarketing application window 57, is played-back. The operation of the function key removes the need for the agent to ask for the caller's phone number and eliminates the possibility of keyboard entry errors. However, for other situations or applications, certain information received from network 11 should be processed and sent to the appropriate host application database computer system 18 or 19 as soon as the voice call is received by the agent terminal 14$_i$, without agent intervention. The need for immediate processing occurs, for example, in the handling of the unique called number (DNIS) for selecting the correct one of the many telemarketing campaigns or services assigned to each agent terminal. Information based on DNIS is used by the telemarketing application program to pull-up windows associated with a particular campaign or service to be provided.

The ability to automate the processing of call-related information when it is sent to agent terminal 14$_i$, can also be addressed using customer recorded keystrokes associated with programmable function keys. A special exemplary keystroke sequence, which can be stored for any function key, will be defined that points to another function key that contains commands, such as COPY, that are to be executed upon receipt of an incoming voice call. However, the function key containing the exemplary special keystroke sequence is never executed. Rather, it is used to initialize the agent terminal 14$_i$ for automatic operation. For example, assume that function key PF8 contains the following keystroke: "%%PF9". The percent signs tells agent terminal 14$_i$ that the content of specified function key PF9 should be executed whenever the agent terminal receives an incoming voice call. Under the above example, PF9 would contain the keystroke/commands necessary to copy the DNIS-based information from the Telephony window 53 to the telemarketing window 57 waiting for the selection of a particular service. Function key PF8, therefore, provides: (1) customer flexibility in the usage and assignment of PF keys for integrated voice/data operation of the agent terminal, (2) an automatic mechanism to disable the integrated voice/data operation by, for example, simply not recording a sequence beginning with "%%" in any PF key, and (3) simple administration of changes in the integrated voice/data operation by re-recording function key to point to another function key containing a new set of COPY commands.

It is to be understood that the above-described embodiments are simply illustrative of the principles of the invention relative to a preferred embodiment. Various other modifications and changes may be made by those skilled in the art which will embody the principles of the invention and fall within the spirit and scope thereof. For example, call-related information could be received by system 10, or by an agent terminal 14$_i$, using any suitable technique, as, for example, in the header information of a packet of information for subsequent processing in the manner outline hereinbefore. The present invention provides an agent terminal with the ability to read and display received call-related information in a first telephony window while using programmable function key commands that are either software or key initiated to automatically obtain the desired campaign information from a host application database computer system for display at the agent terminal, and automatically transfer information between telephony and application windows. The user/system administrator is able to program the programmable function keys of the agent terminals for various steps of servicing a call for each particular service (campaign) being responded to, and such programming is preferable stored on a disk in MCC 17 for downloading into an agent terminal in, for example, shared RAM 40 or other RAM when that agent terminal originally logs in for a session. It is to be understood that such programming for the function keys of an agent terminal could alternatively be inserted into a floppy disk drive at each agent terminal, but such technique would be more costly since the location of a single programmable disk at MCC 17 would not require at each agent terminal. Additionally, agent terminal 14 can also be used for placing outgoing calls to customers over communications network 11 by, inter alia, bringing up a customer's record in a host application window and, for example, automatically using a programmable key to dial the customer's telephone number, and performing operations similar to those described hereinbefore for other functions of such outgoing call.

We claim:

1. A method of handling integrated voice and data call-related information signals received from a communications network by a call-handling system, the call-handling system comprising (1) at least one agent computer terminal, where each computer terminal comprises (i) a multi-window visual display device, (ii) a keyboard, and (iii) a voice communication device, and (2) at least one host application database computer system for storing information related to each service or campaign that the at least one computer terminal is to handle, the method comprising the steps of:

(a) receiving integrated voice and data call-related information signals of an incoming call from the communications network at a selected idle one of the at least one agent computer terminals where the received data call-related information signals comprise a calling number and/or a called number and/or other data supplied by the caller or the communication network;

(b) in the selected agent computer terminal of step (a), receiving the integrated voice and data call-related information from the communications network, and (i) directing the voice call-related information signals to the voice communication device of said agent computer terminal, and (ii) displaying predetermined received data call-related information signals in a first window of the multi-window visual display device while automatically accessing the at least one host application database computer system storing information associated with a campaign or service for retrieving and displaying predetermined host application database information in an at least one second window of the visual display device of the agent computer terminal.

2. The method according to claim 1 wherein the method comprises the further step of:

(c) in performing step (b)(ii), automatically copying predetermined pertinent call-related data displayed in predetermined locations of the first window to predetermined locations within the at least one second window.

3. The method according to claim 2 wherein in performing step (c), performing the step of:

(c1) automatically copying the predetermined pertient call-related data between the first and at least one second window by either (i) the agent computer terminal automatically using pre-programmed keystrokes instructions resident in a memory of the agent computer terminal without depressing a key.

4. The method according to claim 1 wherein the call-handling system further comprises a switching arrangement for routing call-related signals both between the communications network and the call-handling system and between the at least one computer terminal and the at least one host application database computer system, and in performing step (a) performing the steps of:

(a1) the communication network providing the integrated voice and data information signals in separate channels using a first protocol, and (a2) the switching arrangement converting the integrated voice and data signals received in the first protocol into (i) a second protocol readable by the at least one agent computer terminal and (ii) a third protocol readable by the at least one host application database computer system, where the first, second and third protocols may be the same or different protocols.

5. A customer programmable integrated voice and data call-handling system for handling calls for at least one campaign or service comprising:

at least one host application database computer system for storing database information relating to each campaign or service the call-handling system is to handle;

at least one agent computer terminal comprising (i) a multi-windowing visual display device, (ii) a keyboard including keys, (iii) a voice communication device, (iv) means for storing pre-programmed instructions; and (v) means for receiving integrated voice and data information signals from a remote communication system and directing (i) the voice information signals to the voice communication device, and (ii) the data information signals corresponding to a called number, a calling number, or other caller supplied information for displaying in a first window, and (iii) automatically using the called number and the pre-programmed instructions, for accessing the at least one host application database computer system storing the information associated with the campaign or service represented by said called number for retrieving and displaying predetermined host application database information in an at least one second window of the multi-windowing visual display device.

6. The customer programmable integrated voice and data call-handling system according to claim 5 wherein a predetermined preprogrammed instruction related to one of the keys is used to automatically copy predetermined call-related data displayed in predetermined locations of the first window to predetermined locations within the at least one second window.

7. The customer programmable integrated voice and data call-handling system of claim 6 wherein the predetermined pre-programmed instructions are initiated automatically by the agent computer terminal at a predetermined time in the handling of a call or by depressing the one of the keys.

8. The customer programmable integrated voice and data call-handling system of claim 5 wherein the communications system provides the integrated voice and data information signals in separate channels using a first protocol, and the system further comprises:

a switching arrangement for converting the integrated voice and data information signals in the first protocol into (i) a second protocol readable by the at least one agent computer terminal, and (ii) a third protocol readable by the at least one host application database computer system, where the first, second and third protocols may be the same or different protocols.

* * * * *